United States Patent

Yaeger et al.

Patent Number: 6,057,975
Date of Patent: May 2, 2000

[54] FLY HEIGHT ADJUSTMENT IN MAGNETIC STORAGE SYSTEM

[75] Inventors: John R. Yaeger, Sunnyvale; Lawrence W. Gollbach, Felton; John E. Jones, Ben Lomond, all of Calif.

[73] Assignee: Seagate Technology, Inc., Scotts Valley, Calif.

[21] Appl. No.: 08/321,255

[22] Filed: Oct. 11, 1994

[51] Int. Cl.⁷ .................................................. G11B 5/60
[52] U.S. Cl. .................................................. 360/75
[58] Field of Search ........................ 360/75, 77.02, 360/104, 103; 324/212

[56] References Cited

U.S. PATENT DOCUMENTS

| | | | |
|---|---|---|---|
| 4,812,927 | 3/1989 | Fecher | 360/75 |
| 4,814,908 | 3/1989 | Schmitz | 360/77.02 |
| 4,816,743 | 3/1989 | Harms et al. | 324/56 |
| 4,893,205 | 1/1990 | Hoppe et al. | 360/104 |
| 4,942,609 | 7/1990 | Meyer | 360/25 |
| 5,012,369 | 4/1991 | Owe et al. | 360/104 |
| 5,339,702 | 8/1994 | Viches | 324/212 |
| 5,341,256 | 8/1994 | Murata et al. | 360/75 |
| 5,412,519 | 5/1995 | Buettner et al. | 360/75 X |
| 5,450,256 | 9/1995 | Murata et al. | 360/75 |
| 5,450,747 | 9/1995 | Flechsig et al. | 73/105 |
| 5,488,857 | 2/1996 | Homma et al. | 73/105 |

FOREIGN PATENT DOCUMENTS

| | | |
|---|---|---|
| 63-054350 | 12/1989 | Japan . |
| 1178021 | 8/1991 | Japan ........... 360/75 |
| 04005086 | 11/1993 | Japan . |

*Primary Examiner*—Andrew L. Sniezek
*Assistant Examiner*—James L Habermehl
*Attorney, Agent, or Firm*—Westman, Champlin & Kelly, P.A.

[57] ABSTRACT

A method and apparatus for adjusting fly height between a disc surface of a magnetic storage system disc and a slider supported on a flexure arm in a magnetic disc drive. The slider carries a transducing head. The disc drive is rotated at a reduced testing RPM. The flexure arm is heated using a laser to achieve a desired flexure arm bend which corresponds to a desired fly height. Desired bend is achieved at the point when the slider is just in contact with asperities on the disc surface. Following heating, the disc is operated at a normal RPM rate of rotation which is greater than the testing RPM, thereby insuring that the slider flies in close proximity to the disc surface but without contacting the disc surface. Contact between the slider and the disc surface is determined by detecting acoustic noise on the flexure arm.

17 Claims, 6 Drawing Sheets ically added together. Key
FLY HEIGHT ADJUSTMENT IN MAGNETIC STORAGE SYSTEM

BACKGROUND OF THE INVENTION

The present invention relates to magnetic disc storage systems. More specifically, the invention relates to a method and apparatus for determining and adjusting slider fly height in a magnetic disc storage system.

In magnetic storage systems, a magnetic disc rotates at high speed. A read/write transducing head "flies" over the surface of the disc carried on a slider and is used for reading and writing information. The slider has certain hydrodynamic properties which provide lift while the drive rotates. This lift is counteracted by a spring loaded flexure armature which supports the slider. The slider reaches an equilibrium fly height based principally upon the speed of rotation of the disc, the hydrodynamic properties of the slider, and the spring tension of the flexure armature. Typically, fly height can be on the order of tenths of microns or less from the disc surface.

It is known that if the slider and, hence, the transducer head, fly closer to the disc surface, improved reading and writing characteristics are achieved. This is primarily due to improved focusing of the magnetic fields exchanged between the head and the disc surface. Typical techniques of reducing fly height have involved controlling the hydrodynamic properties of the slider or the spring tension of the flexure arm during manufacture. As storage density requirements increase, fly height decreases. Fly height becomes even more critical and greater accuracy in controlling fly height is of even greater importance. Adequate clearance must be maintained such that no catastrophic head-disc contact ("crash") occurs during operation when all of the worst case tolerances are statistically added together. Key contributors to these tolerances include run-out in the disc and slider fly height. If these tolerances could be reduced to zero (or, alternatively, were precisely known for each head-disc interface), sliders could confidently fly closer to the disc.

SUMMARY OF THE INVENTION

The present invention provides a method and apparatus for adjusting fly height between the surface of a disc and a slider supported on a flexure arm in a magnetic storage disc drive. In one embodiment, the disc is rotated at a testing RPM which is less than a normal minimum operating RPM. The flexure arm is heated with a laser which deforms the flexure arm to achieve a desired flexure arm bend and thereby a desired fly height. The desired bend occurs approximately at the point where the slider contacts asperities in the disc surface. During normal operation, the RPM of the disc drive is increased thereby causing fly height to increase such that the slider flies in close proximity to the disc surface without touching asperities in the surface.

Flexure arm bend can be either increased or decreased by selectively heating portions of the flexure arm with the laser. In one embodiment, laser light is delivered to the flexure arm through a fiber optic cable. This allows the laser light to be directed between discs in a disc stack.

In one embodiment, an acoustic sensor, such as a piezoelectric sensor, is attached to the flexure arm and used to determine whether the slider is in contact with the disc surface.

DETAILED DESCRIPTION OF THE PREFERRED EMBODIMENTS

Figure 1:
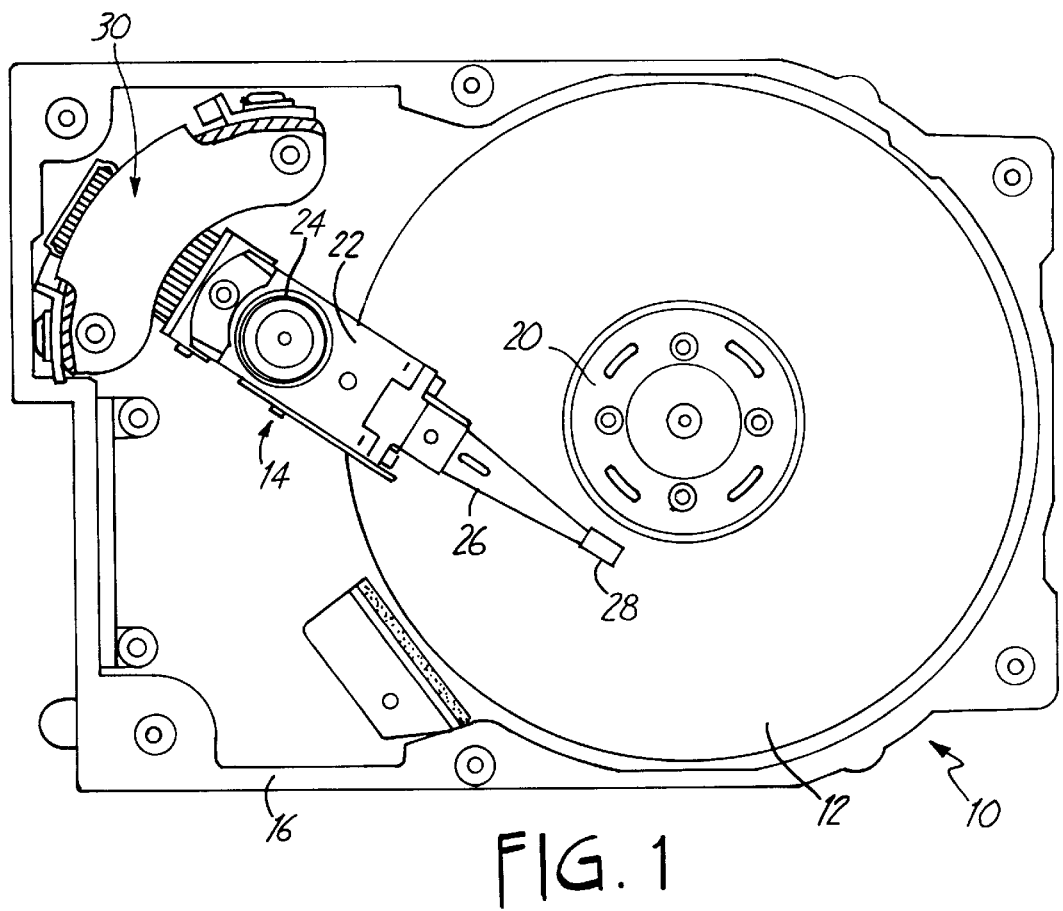
FIG. 1 is a top plan view of a magnetic storage disc drive storage system.

FIG. 1 is a top plan view of magnetic disc drive storage system 10 which includes disc 12 and armature assembly 14 carried by chassis 16. Disc 12 rotates about hub 20 driven by a spindle motor 32 (not shown in FIG. 1). Armature assembly 14 rotates about bearing 24 and includes E-block 22 and flexure arm 26.

Flexure arm 26 carries slider assembly 28 which includes a transducing head (not shown). Armature assembly 14 is moved about bearing 24 by actuator 30.

Figure 2:
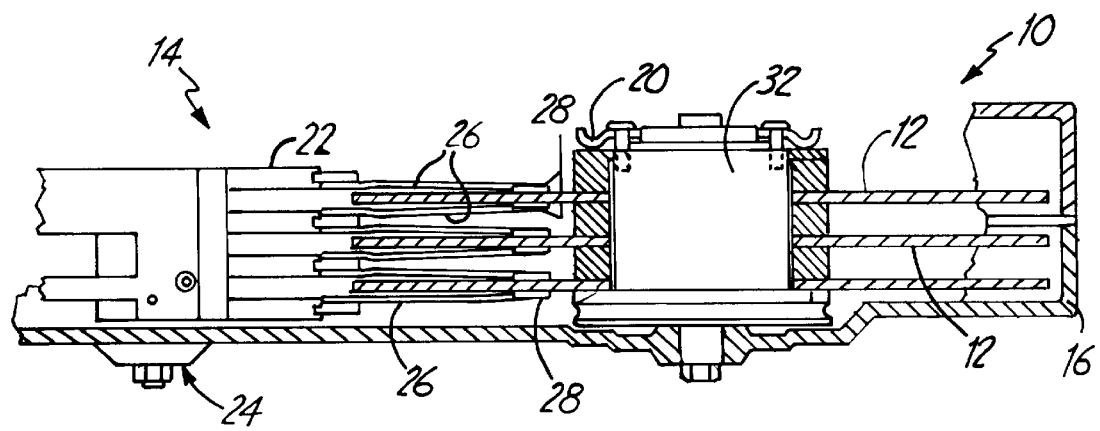
FIG. 2 is a side cross-sectional view of the disc drive of FIG. 1 showing the disc stack and E-block assembly.

FIG. 2 is a side cross-sectional view of disc drive 10 which shows a stack of discs 12 which spin about motor 32 adjacent a plurality of sliders 28 carried on flexure armatures 26 all supported by E-block 22. In operation, as discs 12 rotate sliders 28 "fly" over the surface of discs 12. Sliders 28 are carried on flexure arms 26 which are spring loaded in a direction which urges sliders 28 toward the surfaces of discs 12. Fly height is mainly determined by hydrodynamic properties of sliders 28, the rate or rotation of discs 12 and the spring constants of flexure arms 26.

Figure 3:
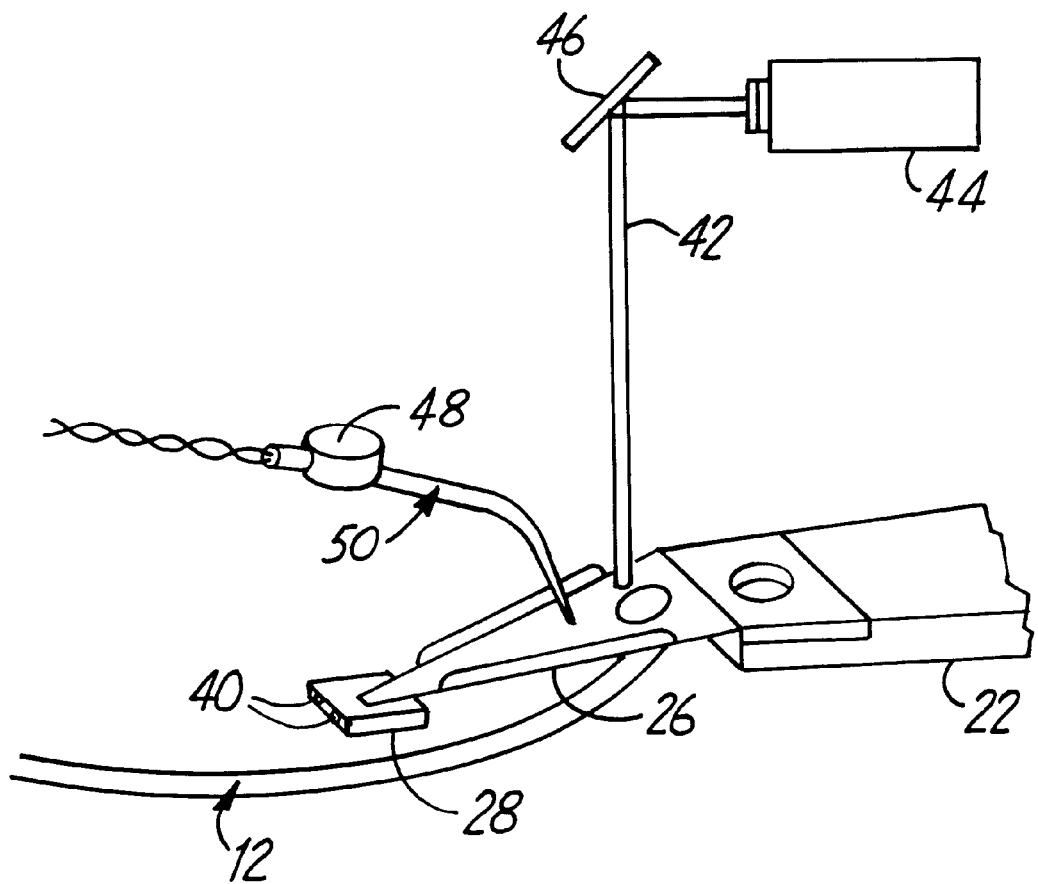
FIG. 3 is a top plan view of a flexure armature showing fly height adjustment.

FIG. 3 is a perspective view of flexure arm 26 showing one method and apparatus in accordance with the invention to adjust fly height. This embodiment is useful where easy access to the flexure is available. For example, in a single disc system. When access is limited in multiple disc systems, other techniques, discussed later, are used. FIG. 3 also shows transducing heads 40 carried on slider 28. In FIG. 3, a laser beam 42, generated by laser 44, is directed toward flexure arm 26 using mirror 46. An acoustic sensor 48 is acoustically coupled to flexure arm 26 using whisker 50.

As disc 12 rotates, contact between slider 28 and disc 12 causes an acoustic noise signal to be generated which is carried on flexure arm 26. This can be detected using acoustic sensor 48 which is acoustically coupled to flexure arm 26 through whisker 50. Whisker 50 contacts flexure arm 26 at a position, and with sufficiently low force, so as not to meaningfully affect the fly height of slider 28. It has been discovered that flexure arm 26 can be bent to a desired angle by selectively applying laser beam 42. Thus, flexure arm 26 can be heated such that slider 28 moves away from or toward the surface of disc 12. At one extreme, slider 28 no longer contacts disc 12.

Figure 4:
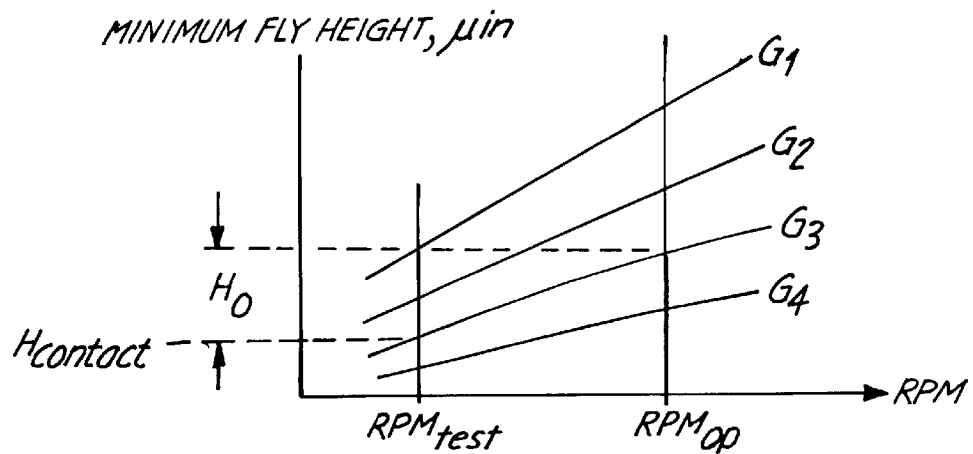
FIG. 4 is a graph of minimum fly height in microinches versus RPM of the magnetic storage disc.

FIG. 4 is a graph of minimum fly height of slider 28 versus RPM of disc 12. This curve is plotted for sliders under various load forces due to the bend in flexure arm 26. These plots are identified as $G_1$, $G_2$, $G_3$ and $G_4$, where the gram weight $G_1$ is less than the gram weight $G_2$ is less than the gram weight $G_3$ is less than the gram weight $G_4$. These curves are generated either experimentally or via modeling for the specific head-disc combination being adjusted. Over normal operating ranges, these curves are nearly straight lines which slightly diverge as RPM increases. $H_{CONTACT}$ the height at which slider 28 first contacts asperities in the surface of disc 12. HO is the desired fly height above $H_{CONTACT}$ at which there is enough spacing to accommodate non-statistical operating variations such as those due to altitude. For example, $H_0$ may be about 1.0 microinch. During normal operation, disc 12 rotates at $RPM_{OP}$. During fly height adjustment, disc 12 is operated at $RPM_{TEST}$. $RPM_{TEST}$ is calculated using a is straight line approximation for the desired gram weight ($G_3$ in FIG. 4) based upon the desired $H_0$ at $RMP_{OP}$. One ambiguity is that the precise load ($G_3$ in this case) is not exactly known. A conservative approach is to choose the maximum load. For example, if the flexure load ambiguity is 5±0.7 grams, then $RPM_{TEST}$ is chosen using the maximum load of 5.7 grams and the desired $H_0$ of 1.0 microinch, for this example.

After setting the rotation of disc 12 to $RMP_{TEST}$, head-disc contact is measured using sensor 48. Laser 44 is used to adjust the bend in flexure 26 such that the slider is just at the point of $H_{CONTACT}$ shown in the graph in FIG. 4. In one embodiment, whisker 50 is a metallic whisker which applies only a very small force (about 0.1 grams) on flexure arm 26. Acoustic sensor 48 and sensing circuitry (not shown in FIG. 4) are tuned to the major body resonance of slider 28 which is nominally about 400 to about 600 KHz. The effect of the laser is to heat a small area of flexure arm 26 which causes the arm to bend due to localized thermal expansion. This bend is permanent. The flexure load can be either increased or decreased depending on the location of the heated area. When the load has been decreased to the point where acoustic noise has just vanished, the RPM is raised to the normal operating RPM of $RPM_{OP}$ and the whisker is removed.

Figure 5:
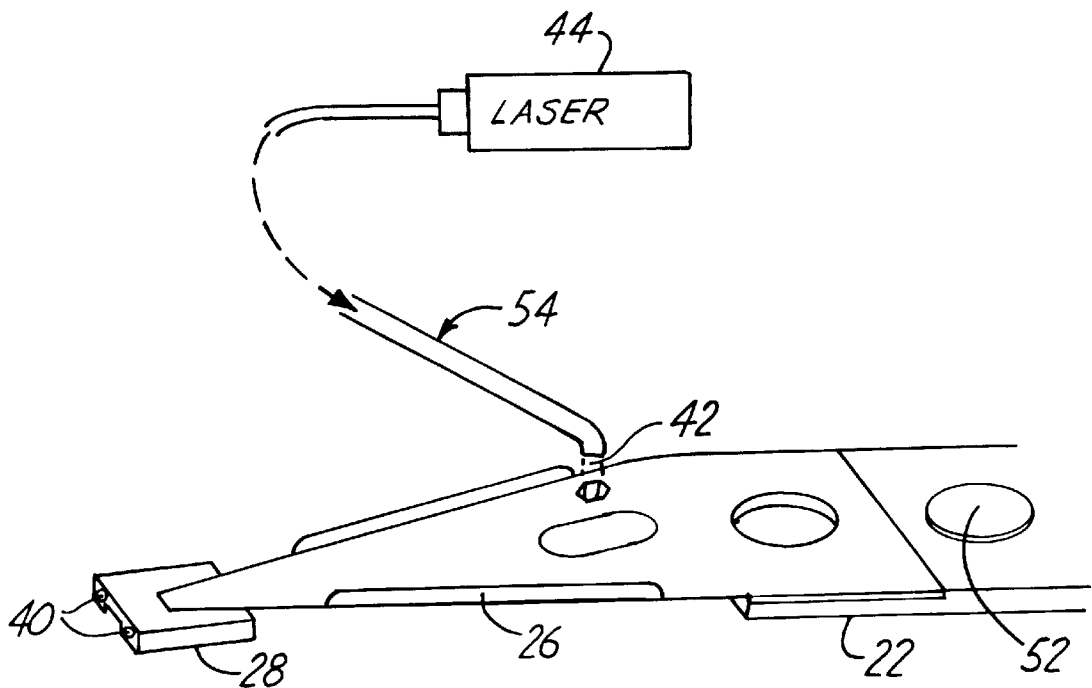
FIG. 5 is a top plan view of a flexure armature showing fly height adjustment in accordance with another embodiment.

FIG. 5 shows another embodiment of the present invention. In FIG. 5, an optical fiber 54 is used to direct laser beam 42 from laser 44 to the appropriate location on flexure arm 26. In one embodiment, optical fiber bundle 54 has a diameter of 0.015 inches, with a 45° angle on the end to direct the laser energy at right angles to the axis of the fiber bundle. Fiber bundle 54 may also include fibers for visually positioning the bundle. Additionally, FIG. 5 shows acoustic sensor 52 directly mounted on E-block assembly 22 proximate flexure arm 26. The embodiment shown in FIG. 5 is well suited for E-block stacks such as that shown in FIG. 2. Fiber optic cable 54 may be inserted between adjacent discs 12 in the disc stack. Acoustic sensor 52 is permanently mounted to E-block assembly 22 and thus does not require a whisker to be inserted between adjacent discs. In one embodiment, sensor 52 is a piezoelectric sensor.

Figure 6A:
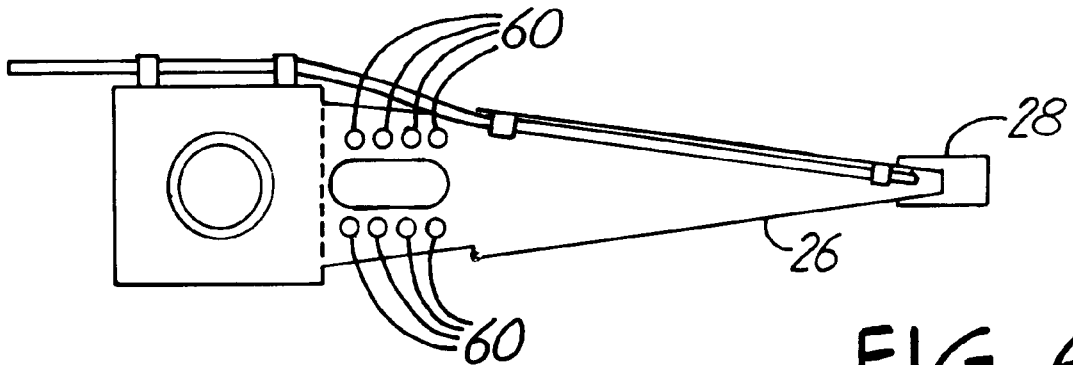
FIG. 6A through 6C are top plan views of flexure armatures showing laser heating spots.
Figure 6B:
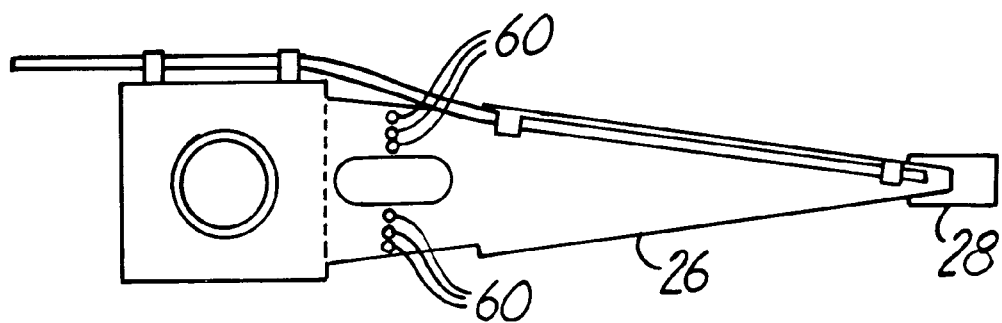
Figure 6C:
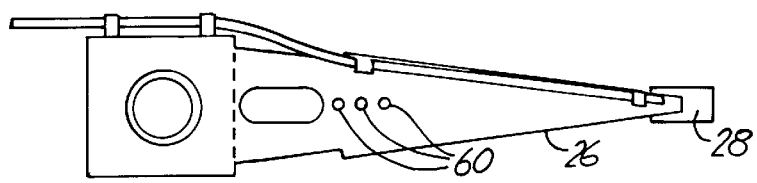

FIGS. 6A through 6C show various configurations of heating points 60 on flexure arm 26. FIG. 6A shows heating points 60 extending along the length of arm 26 on each side of arm 26. FIG. 6B shows heating points 60 perpendicular across the surface of flexure arm 26. In FIG. 6C, heating points 60 are along the center axis of flexure arm 26. For the flexure arm tested, the heating shown in FIGS. 6A and 6B tended to bend slider 28 upward away from the disc, while that shown in FIG. 6C tended to move slider 28 closer to the disc thereby reducing fly height. It is understood that FIGS. 6A through 6C are merely examples and appropriate heating points should be determined for each particular design of a flexure arm.

Figure 7:
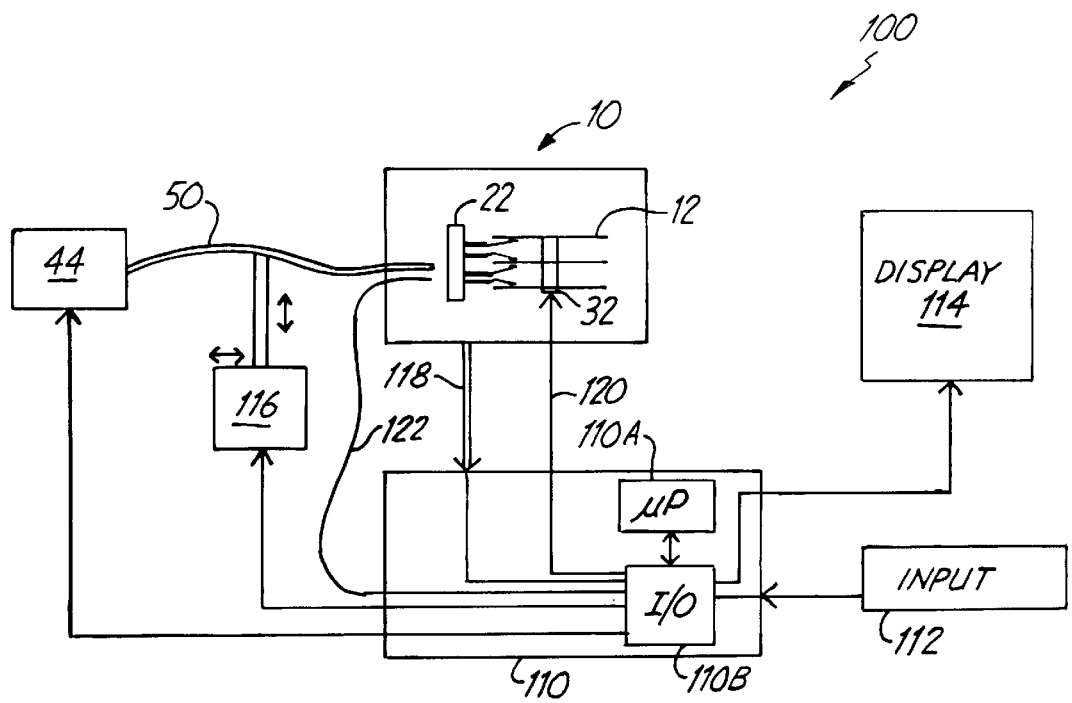
FIG. 7 is a diagram showing an apparatus for adjusting fly height in accordance with the invention.

FIG. 7 is a diagram of a fly height adjustment system 100. Fly height adjustment system 100 is used to automate the fly adjustment described above. Disc drive 10 is shown operably coupled to fly height adjustment system 100. Fly height adjustment system 100 includes controller 110, input 112, display 114 and positioner 116. Controller 110 includes microprocessor and memory 110A and I/O circuitry 110B and couples to disc drive 10 through cable 118 which provides an electrical connection to piezoelectric sensors 52 (shown in FIG. 5) in disc drive 10. Controller 110 also controls the RPM of disc drive 10 through control cable 120. In operation, controller 110 slows disc rotation of drive 10 to $RPM_{TEST}$. Controller 110 controls laser 44 and directs the laser beam by positioning optical fiber 54 using positioner 116. Controller 110 selectively heats flexure arms in drive 10 as described above. In one embodiment, controller 110 visually inspects the flexure arm using optical fiber 122. This visual inspection is used for positioning the beam generated by laser 44. Input 112 is used by an operator to control system 100, and display 114 displays test results and status of system 100.

In one embodiment, laser 44 comprises an Nd-doped Yag laser which operates in the infrared region at about 1,060 nm. The laser strength averages about 4.5 watts and typical ranges are between 1 and 10 watts. The laser is operated for a duration of 6 milliseconds.

Although the present invention has been described with reference to preferred embodiments, workers skilled in the art will recognize that changes may be made in form and detail without departing from the spirit and scope of the invention. For example, the appropriate location, duration and size of the heating points applied to the flexure arm are determined for the particular flexure arm in use. It is suggested that the appropriate parameters be determined by experimental operation using the desired flexure arm to determine the effects of fly height, roll and pitch of the slider. Further, visual inspection can be through any appropriate means other than a fiber optic cable such as a small camera (i.e., a CCD camera). Additionally, head/disc contact can be detected using any appropriate method such as head/disc capacitance or read back signal strength.

What is claimed is:

1. A method of adjusting fly height between a disc surface and a slider supported on a spring loaded flexure arm in a disc drive, comprising the steps of:

obtaining the disc drive;

obtaining a laser; and heating the spring loaded flexure arm with the laser white rotating the disc at a testing rate of rotation which is less than a normal minimum operating rate of rotation, thereby deforming a bend in the spring loaded flexure arm to achieve a desired flexure arm bend and thereby a desired fly height.

2. The method of claim 1 wherein the desired spring loaded flexure arm bend is achieved approximately at the point where the slider contacts asperities in the disc surface.

3. An apparatus for adjusting fly height between a disc surface and a slider supported on a flexure arm in a disc drive, comprising:

a laser which provides a laser beam directed at the flexure arm;

a sensor coupled to the flexure arm which detects contact between the slider and the disc surface and provides an output; and a controller coupled to the sensor and the laser which controls operation of the laser based upon the sensor output and responsively controls heating of the flexure arm with the laser to achieve a desired fly height.

4. The apparatus of claim 3 wherein the disc surface rotates at a rate of $RPM_{TEST}$ rotations per minute during fly height adjustment which is less than a normal operating rotations per minute of $RPM_{OP}$.

5. The apparatus of claim 3 including an optical fiber which directs the laser beam toward the flexure arm.

6. The apparatus of claim 3 including a positioner coupled to the controller which responsively positions the laser beam on the flexure arm.

7. The apparatus of claim 3 wherein the sensor is a piezoelectric sensor which senses vibrations in the flexure arm.

8. The apparatus of claim 3 wherein the controller pulses the laser beam to obtain desired fly height.

9. A method of adjusting fly height between a disc surface and a slider supported on a flexure arm in a disc drive, comprising the steps of:

obtaining the disc drive;

rotating the drive at a rate of rotation, $RMP_{TEST}$, which is less than a normal operating rate of rotation $RMP_{OP}$;

detecting contact between the slider and the disc surface;

adjusting fly height based upon detected contact; and operating the drive at a rate of rotation of $RPM_{OP}$.

10. The method of claim 9 wherein adjusting fly height comprises heating the flexure arm with a laser.

11. The method of claim 9 wherein detecting contact comprises detecting acoustic noise on the flexure arm.

12. An apparatus for adjusting fly height between a disc surface and a slider supported on a flexure arm in a disc drive, comprising:

a controller for operating the disc at a rate of rotation, $RPM_{TEST}$ which is less than a normal operating rate of rotation, $RPM_{OP}$;

a sensor for detecting contact between the slider and the disc surface; and a heating device which heats the flexure arm;

wherein the controller controls the heating device based upon contact detected by the sensor.

13. The apparatus of claim 12 wherein the heating device comprises laser.

14. The apparatus of claim 13 including a fiber optic cable coupled to the laser for directing a laser beam.

15. The apparatus of claim 12 wherein the sensor comprises an acoustic sensor coupled to flexure arm.

16. The apparatus of claim 12 including a positioner coupled to heating device which positions the heating device in response to signals from the controller.

17. The apparatus of claim 12 including a visual inspection device coupled to the controller.

* * * * *

UNITED STATES PATENT AND TRADEMARK OFFICE
CERTIFICATE OF CORRECTION

PATENT NO. : 6,057,975
DATED : May 2, 2000
INVENTOR(S) : John R. Yaeger et al.

It is certified that error appears in the above-identified patent and that said Letters Patent is hereby corrected as shown below:

Col. 4, line 44, after "laser", delete "white" and insert --while--.

Signed and Sealed this

Twentieth Day of March, 2001

Attest:

NICHOLAS P. GODICI

Attesting Officer        Acting Director of the United States Patent and Trademark Office